United States Patent [19]

Hillhouse et al.

[11] 4,085,179

[45] Apr. 18, 1978

[54] PROCESS FOR PREPARING DRY MIX BRAKE LINING

[75] Inventors: Mial T. Hillhouse, Canton; Richard L. Ramsey, Akron, both of Ohio

[73] Assignee: The Goodyear Tire & Rubber Company, Akron, Ohio

[21] Appl. No.: 674,359

[22] Filed: Apr. 7, 1976

Related U.S. Application Data

[63] Continuation of Ser. No. 515,960, Oct. 18, 1974, abandoned.

[51] Int. Cl.² .............................................. B29C 3/00
[52] U.S. Cl. ........................... 264/122; 260/29.7 NR; 427/222
[58] Field of Search ............... 264/122; 260/29.7 NR; 427/222

[56] References Cited

U.S. PATENT DOCUMENTS

| | | | |
|---|---|---|---|
| 3,316,195 | 4/1967 | Grosner et al. | 260/29.7 NR |
| 3,505,446 | 4/1970 | Griffith | 264/122 |
| 3,814,713 | 6/1974 | Honda et al. | 260/29.7 NR |

*Primary Examiner*—Donald J. Arnold
*Assistant Examiner*—James R. Hall
*Attorney, Agent, or Firm*—H. C. Young, Jr.

[57] ABSTRACT

This invention relates to a process for increasing the coefficient of friction of dry mix organic brake linings by coating a finely divided phenolic resin with rubber latex, thoroughly mixing with friction brake material and molding and curing the resulting compound under pressure.

2 Claims, No Drawings

PROCESS FOR PREPARING DRY MIX BRAKE LINING

This is a continuation, of application Ser. No. 515,960 filed Oct. 18, 1974 now abandoned.

This invention relates to a process for making organic brake linings. More specifically this invention relates to a method for increasing the coefficient of friction of dry mix organic brake linings by incorporating therein a rubbery latex which is deposited on a finely divided phenolic resin.

Organic brake linings have long been known to the art. Previously these linings have been formed by a process designated in the art as a "wet mix" process. In the wet mix process rubber and a phenolic resin are placed in a common solvent to form a cement and insuring an intimate dispersion of the rubber and phenolic resin. Friction materials, such as asbestos, and other fillers are added to the cement and thoroughly dispersed. The resulting compound is then molded and cured. The wet mix process is expensive because of solvent costs. The process also exposes process personnel to the solvent fumes and asbestos, currently strongly suspected of possessing carcinogenic properties.

Protection of process personnel from contacting potentially dangerous materials requires a process which eliminates solvents and allows asbestos to be incorporated into the compound in a closed environment. Such a process is known in the art as the "dry mix" process wherein all ingredients of the lining are mixed without benefit of a solvent while in a closed environment. Current dry mix processes have no rubber ingredient. Dry mix processes do not disperse the rubber uniformly as does the wet mix process, and rubber has therefore not heretofore been effective. The differences in results are obtained because of a lack of homogeniety of the phenolic resin and the rubbery polymer as used in the dry mix process. The rubber tends to "bleed" from the brake lining during the molding process and is lost to the cured lining. The loss of the rubbery polymer lowers the coefficient of friction of the lining, thus lowering its braking capacity. In addition, removal of the lining from the mold after cure has often resulted in broken linings even when mold release agents are used. The linings resist removal from the mold and the force required to remove them often causes breakage. The latex addition aids in the release characteristics of the molded part.

It is therefore an object of the present invention to provide a process for obtaining a dry mix organic brake lining with a satisfactory high coefficient of friction. Other objects will become apparent to those skilled in this art as the description proceeds.

It has been discovered that a dry mix organic brake lining with a high coefficient of friction can be obtained by the process of first coating the finely divided phenolic resin with a rubbery latex before blending with asbestos and other friction materials, producing a finely dispersed mixture which can be molded into brake linings. The linings so produced are also more easily removed from the molds after curing.

Phenolic resins referred to in the present invention are the reaction products of phenols and formaldehydes. These resins are well known to those skilled in this art. Representative examples of such resins are SP6240, SP6280, CRJ416, and BRJ377 which are manufactured by Schenectady Chemicals Inc.; Varcum 5169 and Varcum 3048 which are manufactured by Reichhold Chemical Corp., Varcum Division; CR503 and Synco 9469 which are manufactured by Catalin Resin Co.; and CR145 which is manufactured by Ashland Chemical Co.

Examples of the softening point and hot plate cure (time to resin crosslinking) are given for some of these resins in Table I.

Table I

| Resin | Softening Point (° C) | Hot Plate Cure (sec) 160° F |
|---|---|---|
| Varcum 3048 | 97 | 32 |
| Varcum 5169 | 65 | 63[(1)] |
| BRJ 377 | 93 | 30 |
| SP 6240 | 81 | 28 |
| SP 6280 | 70 | 31 |
| CRJ 377 | 98 | 22 |
| Synco 9469 | 89 | 27 |

The finely divided (less than 325 Tyler mesh) phenolic resins of choice are coated with a rubbery latex. The final product of the coating procedure also will pass a 325 Tyler mesh screen. Representative examples of such latices are styrene/butadiene (SBR) rubbers and acrylonitrile rubbers. Styrene/butadiene latices are preferred. The latex can be deposited on the phenolic resin from about 1 to about 32 parts by weight based on the weight of the phenolic resin. Usually from about 5 to about 25 parts by weight of the latex are used.

The styrene portion of the SBR latex can range from 15 to 40 percent by weight. Generally a latex containing from 20 to 30 percent styrene by weight will be used.

The phenolic resin/latex composition is intimately blended with the remaining friction materials in an internal mixing apparatus such as a Banbury mixer, intermix, V-shell blender or ball mixer.

After intimately blending the ingredients of the lining the compound is placed in a compression mold for curing. Compression molding is used to hold the uncured resin material together until crosslinking under heat occurs. Usually from about 250 to about 50,000 pounds per square inch pressure is used, but from about 5,000 to about 10,000 pounds per square inch pressure is preferred.

The organic liner is comprised of friction materials bonded together by an organic resinous matrix. The matrix forms when the compound is heated to a temperature from about 250° to 350° F., but usually a temperature of from about 275° to 325° F. is used. The temperature can be maintained for from about 1 to 50 minutes but from about 25 to 40 minutes is usually sufficient.

After curing, a post-cure "bake" can be used to insure complete crosslinking of the organic resinous material. The cured organic brake linings are placed in an oven which usually ranges from room temperature to 500° F. The temperature can be raised to about 1,000° F. at which time the linings are removed. Any unreacted crosslinking sites are thus joined. The post-cure bake is usually not necessary and is used merely to insure complete crosslinking.

Resins effective in the present invention are heat-reactive, one-step alkaline phenolic formaldehyde resins. Two-step phenolic resins are also effective. The phenolic resins can be coated with latex by any means known to those skilled in the art. Many means of coating resins are available. The resin need only retain a finely divided state at the conclusion of the coating procedure. These coated resins are sometimes referred to as "frosted" resins.

In the examples given herein the phenolic resin was coated with polymer coagulated from the latex form. Phenolic resin (Varcum 5169 sold by Reichhold Chemical Company) was slurried in 120° F. water which contained approximately a 1.5:1 mixture of sulfuric acid and alum in sufficient quantity to have a final pH of between 4 and 6 after coagulation of the rubber latex. Styrene/butadiene latex (5 percent total solids 23.5 percent styrene) containing a weight of dry rubber equal to 20 percent of the weight of the phenolic resin was slowly added to the resin slurry at 120° F. while the mixture was agitated. After addition of the styrene/butadiene latex, the styrene/butadiene coagulated onto the slurried phenolic resin. The slurried particles were then coated with 92/8 styrene/butadiene resin to prevent surface tack. The styrene/butadiene resin was added at 2 percent total solids and 120° F. to the slurried masterbatch in an amount equal to 5 percent by weight of the phenolic resin. When all the resin latex had coagulated onto the masterbatch the masterbatch was filtered or centrifuged, followed by oven air drying between 140° F. to 150° F. The process will be effective at any temperature between about 100° F. and 160° F.

Styrene/butadiene compositions containing 60 percent or more of styrene by weight are considered to be non-elastomeric and resinous. The resin applied to prevent surface tack does not appear to have any significant effect on the coefficient or function of the compounds of the present invention.

The coated phenolic resin prepared as described above could be used in any typical brake lining formulation. A typical brake lining formulation includes (a) asbestos, (b) metal scavengers such as brass chips or bronze powder, (c) fillers such as barites, diatomaceous earth, iron oxide or silicone carbide, (d) binders such as coated phenolic resin, and (e) lubricants such as copper sulfide or graphite.

The invention is more concretely described with reference to the examples wherein all parts and percentages are by weight unless otherwise specified.

EXAMPLE 1

Brake linings were formed using the following formulation. All percentages are by weight of the total composition.

Asbestos 32%
Brass chips 32%
Barium sulfite 16%
Phenolic resin (Varcum 5169) 20%

All brake lining ingredients were combined in a Patterson-Kelly five quart V-shell blender. The blending was carried out for 30 minutes during which time an intensifier in the interior of the mixer was used to thoroughly mix the composition. The intensifier is a rapidly rotating bar with a plurality of extensions. The purpose of the intensifier is to blend ingredients quickly and to reduce any agglomeration of ingredients to a smaller size. The mixed composition was weighed and preheated at 180° F. for 30 minutes. A weighed charge of the heated composition was charged into a single cavity, kidney shaped brake mold. The mold was placed into a twin piston, steam heated, hydraulically operated compression molding press. The composition was molded at a temperature of 325° F. and 500 pounds per square inch for 30 minutes. The linings were removed from the mold and tested without undergoing a post bake.

EXAMPLE 2

Brake linings were formed using the procedure described in Example 1. The formulation utilized was identical to that used in Example 1 except that 8.4 percent of phenolic resin was replaced with a composite of phenolic resin coated with 20 parts styrene/butadiene latex, produced as explained above. The total formulation contained slightly less than 2 percent by weight of styrene/butadiene. Mixing and curing were carried out identically with the procedure described in Example 1.

The brake linings produced as described in Examples 1 and 2 were tested comparatively using an inertia dynamometer which utilized a stationary brake lining with an area of 1.107 square inches. The dynamometer utilized a disc with a surface speed of 2932 feet per minute, developing a shear of 218.42 pounds per square inch. The lining absorbed 94,576 ft./lbs. of kinetic energy at each stop with a stop time of about 16 seconds and 4 minutes cooling time between stops.

The coefficient of friction from the dynamometer was computed using the following formula:

$$C_f = (12/Ar) \times (I\,W/P\,t_s)$$

where
A = Piston area = 15.75 in$^2$
r = Friction radius 2.0 in
I = Inertia 2.2 slug/ft$^2$
W = Initial Disc Speed in Rad/sec 293.2160
P = Line pressure — variable
$t_s$ = Stop time The line pressure was varied to produce enough pressure to bring the dynamometer to a halt in about 16 seconds. During the course of the 25 stops a glaze formed on the friction surface of the brake lining which appeared to be the cause for the general increase in the coefficient of friction during the test procedure. All linings and tests were made in as uniform a manner as possible.

The results of the testing of brake linings developed from Examples 1 and 2 are shown in Table II.

Table II

| Stop Number | Example 1 | Example 2 | E1-E2 |
|---|---|---|---|
| 1 | .252 | .231 | −.021 |
| 2 | .277 | .290 | .013 |
| 3 | .286 | .325 | .039 |
| 4 | .289 | .341 | .052 |
| 5 | .281 | .280 | −.001 |
| 6 | .287 | .353 | .066 |
| 7 | .268 | .358 | .090 |
| 8 | .267 | .342 | .075 |
| 9 | .251 | .349 | .098 |
| 10 | .260 | .347 | .087 |
| 11 | .276 | .370 | .094 |
| 12 | .273 | .340 | .067 |
| 13 | .271 | .340 | .069 |
| 14 | .271 | .346 | .075 |
| 15 | .287 | .360 | .063 |
| 16 | .302 | .353 | .051 |
| 17 | .291 | .353 | .062 |
| 18 | .295 | .342 | .047 |
| 19 | .293 | .326 | .033 |
| 20 | .293 | .308 | .015 |
| 21 | .286 | .352 | .066 |
| 22 | .273 | .329 | .056 |
| 23 | .267 | .329 | .062 |
| 24 | .267 | .349 | .082 |
| 25 | .267 | .350 | .083 |
| Average | .277 | .334 | .057 |

Percent advantage of Ex. 2 over Ex. 1 — 20.6%

It can be clearly seen that incorporating rubber into the phenolic resin matrix raises the coefficient of friction for the brake lining material and increases the braking horsepower (kinetic energy absorbed) thereby increasing the efficiency of the brake lining.

In the practice of this invention, various dry particulate brake lining materials can be used, representative of which are asbestos, barites, diatomaceous earth, graphite and copper sulfide. Materials which can be optionally added to the particulate brake lining materials include bronze powder, silicon carbide and iron oxide.

While certain representative embodiments and details have been shown for the purpose of illustrating the invention, it will be apparent to those skilled in this art that various changes and modifications may be made therein without departing from the spirit or scope of the invention.

What is claimed is:

1. In a dry mix process for forming an organic brake lining, comprising:
   (A) blending a mixture of dry finely divided phenolic resin particles with dry particulate brake lining friction materials and
   (B) molding and curing the resulting blend at a temperature in the range of about 275° to about 325° F. and at a pressure of about 250 to about 50,000 psi to bond the resin and friction particles into a unitary brake lining, the improvement comprising, prior to step (A), forming a rubber coating on said phenolic resin particles by
   (1) forming a slurry of said phenolic resin particles having a particle size of less than about 325 Tyler mesh with water containing sufficient sulfuric acid and alum to have a pH in the range of about 4 to about 6 at the end of the following step (2),
   (2) mixing said aqueous resin slurry with an aqueous styrene/butadiene rubber latex to coagulate said rubber latex onto said resin particles to form finely divided rubber coated resin particles,
   (3) adding styrene/butadiene resin to further coat said coagulated rubber coated phenolic resin particles and to prevent surface tack thereon, and
   (4) drying said finely divided coated phenolic resin particles for use in said step (A).

2. The process of claim 1 wherein the dry particulate brake lining friction materials are selected from the group consisting of asbestos, barites, diatomaceous earth, graphite and copper sulfide, and optionally containing additional materials selected from the group consisting of bronze powder, silicon carbide and iron oxide.

* * * * *